US011550838B2

(12) United States Patent
Abhyankar et al.

(10) Patent No.: US 11,550,838 B2
(45) Date of Patent: Jan. 10, 2023

(54) PROVIDING INFORMATION CARDS USING SEMANTIC GRAPH DATA

(71) Applicant: MicroStrategy Incorporated, Vienna, VA (US)

(72) Inventors: Saurabh Abhyankar, McLean, VA (US); Scott Rigney, Arlington, VA (US); Timothy Lang, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 471 days.

(21) Appl. No.: 16/589,053

(22) Filed: Sep. 30, 2019

(65) Prior Publication Data

US 2020/0250217 A1     Aug. 6, 2020

Related U.S. Application Data

(60) Provisional application No. 62/821,132, filed on Mar. 20, 2019, provisional application No. 62/801,290, (Continued)

(51) Int. Cl.
*G06F 16/36*     (2019.01)
*G06F 16/9535*     (2019.01)
(Continued)

(52) U.S. Cl.
CPC .......... *G06F 16/36* (2019.01); *G06F 16/3344* (2019.01); *G06F 16/9024* (2019.01);
(Continued)

(58) Field of Classification Search
CPC .. G06F 16/36; G06F 16/3344; G06F 16/9024; G06F 16/9027; G06F 16/953; G06F 16/9535; G06F 40/30; G06F 40/186; G06N 5/04; G06N 5/022; G06T 11/206; G10L 13/027
(Continued)

(56) References Cited

U.S. PATENT DOCUMENTS 8,661,012 B1    2/2014   Baker et al.
10,810,371 B2   10/2020   Shinn et al.
(Continued)

OTHER PUBLICATIONS

U.S. Office Action in U.S. Appl. No. 16/450,673, dated Jan. 13, 2022, 15 pages.
(Continued)

*Primary Examiner* — Akwasi M Sarpong
(74) *Attorney, Agent, or Firm* — Fish & Richardson P.C.

(57) ABSTRACT

Methods, systems, and apparatus, including computer programs encoded on computer-readable storage media, for providing information cards using semantic graph data. In some implementations, semantic graph data for a semantic graph is stored, where the semantic graph data indicates objects and relationships among the objects, and the objects include a card object that represents characteristics of an information card. A request is received from a client device, and the request is processed using the semantic graph data. Data for the information card is provided to the client device based on the card object indicated by the semantic graph data.

20 Claims, 7 Drawing Sheets

Related U.S. Application Data filed on Feb. 5, 2019, provisional application No. 62/801,239, filed on Feb. 5, 2019.

(51) Int. Cl.

| | | |
|---|---|---|
| *G06F 16/33* | (2019.01) | |
| *G06F 16/901* | (2019.01) | |
| *G06F 40/30* | (2020.01) | |
| *G06F 16/953* | (2019.01) | |
| *G10L 13/027* | (2013.01) | |
| *G06N 5/04* | (2006.01) | |
| *G06T 11/20* | (2006.01) | |

(52) U.S. Cl.
CPC ........ *G06F 16/9027* (2019.01); *G06F 16/953* (2019.01); *G06F 16/9535* (2019.01); *G06F 40/30* (2020.01); *G06N 5/04* (2013.01); *G06T 11/206* (2013.01); *G10L 13/027* (2013.01)

(58) Field of Classification Search
USPC .......................................................... 704/90
See application file for complete search history.

(56) References Cited

U.S. PATENT DOCUMENTS

| | | | |
|---|---|---|---|
| 2004/0220905 | A1 | 11/2004 | Chen et al. |
| 2008/0244540 | A1 | 10/2008 | Feblowitz et al. |
| 2011/0313987 | A1 | 12/2011 | Ghosh et al. |
| 2011/0320187 | A1 | 12/2011 | Motik et al. |
| 2012/0158636 | A1 | 6/2012 | Bowers et al. |
| 2012/0221555 | A1 | 8/2012 | Byrne et al. |
| 2012/0221558 | A1 | 8/2012 | Byrne et al. |
| 2012/0290518 | A1 | 11/2012 | Flinn et al. |
| 2013/0036117 | A1 | 2/2013 | Fisher et al. |
| 2013/0073979 | A1 | 3/2013 | Shepherd et al. |
| 2013/0254736 | A1 | 9/2013 | Chen et al. |
| 2013/0275440 | A1 | 10/2013 | Amer-Yahia et al. |
| 2014/0200891 | A1 | 7/2014 | Henri et al. |
| 2014/0236570 | A1 | 8/2014 | Heck et al. |
| 2014/0236579 | A1* | 8/2014 | Kurz ..................... G06F 40/284 704/9 |
| 2014/0267344 | A1 | 9/2014 | Wilson et al. |
| 2015/0106078 | A1 | 4/2015 | Chang |
| 2015/0106156 | A1 | 4/2015 | Chang et al. |
| 2015/0227563 | A1 | 8/2015 | Walkingshaw et al. |
| 2015/0293954 | A1 | 10/2015 | Hsiao et al. |
| 2015/0347905 | A1 | 12/2015 | Chen et al. |
| 2016/0048368 | A1 | 2/2016 | McGibney et al. |
| 2016/0103878 | A1 | 4/2016 | Boe et al. |
| 2016/0179864 | A1 | 6/2016 | Roberts |
| 2016/0267198 | A1* | 9/2016 | Lahmer ............... G06F 16/9024 |
| 2016/0275204 | A1 | 9/2016 | Miranker et al. |
| 2016/0328467 | A1* | 11/2016 | Zou ....................... G06F 40/242 |
| 2016/0357872 | A1 | 12/2016 | Fader et al. |
| 2017/0024460 | A1* | 1/2017 | Mac an tSaoir ...... G06F 16/334 |
| 2017/0063889 | A1 | 3/2017 | Muddu et al. |
| 2017/0085446 | A1 | 3/2017 | Zhong et al. |
| 2017/0147635 | A1* | 5/2017 | McAteer ............. G06F 16/2246 |
| 2017/0228435 | A1 | 8/2017 | Tacchi et al. |
| 2017/0293947 | A1 | 10/2017 | Singh |
| 2017/0329844 | A1 | 11/2017 | Tacchi et al. |
| 2017/0372204 | A1 | 12/2017 | Sweeney et al. |
| 2018/0039854 | A1 | 2/2018 | Wren |
| 2018/0069887 | A1 | 3/2018 | Chauhan et al. |
| 2018/0089281 | A1 | 3/2018 | Li et al. |
| 2018/0089328 | A1 | 3/2018 | Bath et al. |
| 2018/0189388 | A1 | 7/2018 | Soares et al. |
| 2018/0189389 | A1 | 7/2018 | Soares et al. |
| 2018/0196831 | A1 | 7/2018 | Maybee et al. |
| 2018/0241660 | A1 | 8/2018 | Fletchet et al. |
| 2018/0246942 | A1* | 8/2018 | Chen ..................... G06F 16/248 |
| 2018/0307744 | A1* | 10/2018 | Gadekar ............... G06F 40/295 |
| 2018/0365309 | A1 | 12/2018 | Oliner et al. |
| 2019/0005025 | A1* | 1/2019 | Malabarba ........... G06F 40/295 |
| 2019/0108274 | A1* | 4/2019 | DaBoll-Lavoie ... G06F 16/3338 |
| 2019/0220471 | A1* | 7/2019 | Mota Toledo ......... G06N 7/005 |
| 2019/0339950 | A1* | 11/2019 | Meyer ..................... G06F 8/38 |
| 2020/0226156 | A1* | 7/2020 | Borra .................. G06F 16/9024 |
| 2020/0250230 | A1 | 8/2020 | Abhyankar et al. |
| 2020/0250235 | A1 | 8/2020 | Abhyankar et al. |
| 2020/0250245 | A1 | 8/2020 | Abhyankar et al. |
| 2020/0252281 | A1 | 8/2020 | Abhyankar et al. |
| 2020/0301953 | A1 | 9/2020 | Abhyankar et al. |

OTHER PUBLICATIONS

U.S. Office Action in U.S. Appl. No. 16/514,946, dated Jan. 5, 2022, 13 pages.

U.S. Office Action in U.S. Appl. No. 16/450,673, dated Sep. 22, 2021, 21 pages.

U.S. Office Action in U.S. Appl. No. 16/677,183, dated Sep. 10, 2021, 26 pages.

U.S. Office Action in U.S. Appl. No. 16/677,427, dated Nov. 5, 2021, 30 pages.

cio.com [online], "Why your BI strategy needs a universal semantic data layer," Nov. 10, 2017, retrieved on Feb. 27, 2020, retrieved from URL <https://www.cio.com/article/3236566/why-your-bi-strategy-needs-a-universal-semantic-data-layer.html>, 6 pages.

commumty.microstrategy.com [online], "Amazon's Alexa: Key Analytics Applications That Deliver Voice Activated Reporting," May 23, 2017, retrieved on Feb. 27, 2020, retrieved from URL <https://community.microstrategy.com/s/article/Amazon-s-Alexa-Key-Analytics-Applications-That-Deliver-Voice-activated-Reporting?language=en_US>, 2 pages.

community.microstrategy.com [online], "How to Implement Voice-controlled Data Analytics With Amazon's Alexa," May 23, 2017, retrieved on Feb. 27, 2020, retrieved from URL <https://commumty.microstrategy.com/s/article/How-to-Implement-Voice-controlled-Data-Analytics-With-Amazon-s-Alexa?language=en_US>, 3 pages.

community.microstrategy.com [online], "HyperVoice and HyperVision," Feb. 14, 2019, retrieved on Feb. 27, 2020, retrieved from URL < https://community.microstrategy.com/s/question/0D544000073QxyCCAS/hypervoice-and-hypervision?language=en_US>, 2 pages.

community.microstrategy.com [online]—"What is MicroStrategy HyperIntelligence?," Jan. 24, 2019, retrieved on Feb. 27, 2020, retrieved from URL <https://community.microstrategy.com/s/article/KB4423-88-What-is-MicroStrategy-HyperIntelligence?language=en_US>, 13 pages.

constellationr.com [online], "MicroStrategy Embeds Analytics Into Any Web Interface," Feb. 12, 2019, retrieved on Feb. 27, 2020, retrieved from URL <https://www.constellationr.com/blog-news/microstrategy-embeds-analytics-any-web-interface>, 8 pages.

datanami.com [online], "Why Enterprise Knowledge Graphs Need Semantics," Oct. 2, 2017, retrieved on Feb. 27, 2020, retrieved from URL <https://www.datanami.com/2017/10/02/enterprise-knowledge-graphs-need-semantics/, 3 pages.

doughenschen.com [online], "MicroStrategy Embeds Analytics Into Any Web Interface," Feb. 10, 2019, retrieved on Feb. 27, 2020, retrieved from URL <https://doughenschen.com/2019/02/10/microstrategy-embeds-analytics-into-any-web-interface/>, 6 pages.

eweek.com [online], "MicroStrategy Streamlines Analytics With 'Zero Clicks' UI," Jan. 9, 2019, retrieved on Feb. 27, 2020, retrieved from URL <https://www.eweek.com/enterprise-apps/microstrategy-streamlines-analytics-with-zero-clicks-ui>, 5 pages.

idevnews.com [online], "MicroStrategy 2019 Brings AI/ML & Sematic Technologies to BI, Analytics," Feb. 21, 2019, retrieved on Feb. 27, 2020, retrieved from URL <https://www.idevnews.com/stories/7248/MicroStrategy-2019-Brings-AIML-Sematic-Technologies-to-BI-Analytics>.

ir.microstrategy.com [online], "MicroStrategy Offers a Better Long-Term Solution for Enterprises Caught in Analytics Industry Upheaval," Jan. 11, 2019, retrieved on Feb. 27, 2020, retrieved from URL <https://ir.microstrategy.com/news-releases/news-release-details/microstrategy-offers-better-long-term-solution-enterprises>, 5 pages.

Lippens, "Amazon's Alexa: Key Analytics Applications That Deliver Voice Activated Reporting," PowerPoint Presentation, May 2017,

(56) References Cited

OTHER PUBLICATIONS retrieved from URL <https://custom.event.com/83AD54AE0B7F4CBC94A9A945D0A278DA/files/d055b16dd2e64b6c94c20d234b1f5ea5.pdf>, 23 pages.

Lippens., "How to Implement Voice-controlled Data Analytics With Amazon's Alexa," PowerPoint, May 2017, retrieved from URL <https//custom.event.com/83AD54AE0B7F4CBC94A9A945D0A278DA/files/03101961245844b89fd52471fbb9b531.pdf>, 25 pages.

microstrategy.com [online], "2020 Enterprise Analytics Trends: The Semantic Graph Becomes Paramount to Delivering Business Value," Dec. 12, 2019, retrieved on Feb. 27, 2020, retrieved from URL <https://www.microstrategy.com/us/resources/blog/bi-trends/2020-enterprise-analytics-trends-the-semantic-graph-becomes-paramount-to-delivering-business-value>, 7 pages.

microstrategy.com [online], "7 Trending Technology Sessions You Won't Want to Miss at MicroStrategy World 2019," Dec. 27, 2018, retrieved on Feb. 27, 2020, retrieved from URL <https://www.microstrategy.com/us/resources/blog/bi-trends/seven-trending-technology-sessions-at-microstrateg, 10 pages.

microstrategy.com [online], "A Semantic Graph Unlocks HyperIntelligence," Nov. 20, 2019, retrieved on Feb. 27, 2020, retrieved from URL <https://www.microstrategy.com/us/resources/blog/bi-trends/a-semantic-graph-unlocks-hyperintelligence>, 9 pages.

microstrategy.com [online], "Build and Deploy Hypercards Using Workstation," Feb. 23, 2019, retrieved on Feb. 27, 2020, retrieved from URL <https://www.microstrategy.com/getmedia/8103f59b-3416-4a33-bd6a-2e99c9afd474/Build-and-Deploy-HyperCards-Using-Workstation>, 30 pages.

microstrategy.com [online], "MicroStrategy 2019: Built for Breakthroughs," Jan. 7, 2019, retrieved on Feb. 27, 2020, retrieved from URL <https://www.microstrategy.com/us/resources/blog/news-and-events/microstrategy-2019-built-for-breakthroughs, 8 pages.

microstrategy.com [online], "The Enterprise Semantic Graph" Feb. 13, 2019, retrieved on Feb. 27, 2020, retrieved from URL <https://www.microstrategy.com/getmedia/a6ad9b4a-a0fe-4247-8ae5-477c0efb4458/Published-World-2019-Enterprise-Semantic-Graph>, 21 pages.

microstrategy.com [online], "The Enterprise Semantic Graph: Laying the Foundation for Revolutionary Applications," Jan. 15, 2019, retrieved on Feb. 27, 2020, retrieved from URL <https://www.microstrategy.com/us/resources/blog/bi-trends/the-enterprise-semantic-graph-laying-the-foundation-for-revolutionary-applications>, 7 pages.

microstrategy.com [online], "Whats New in MicroStrategy 2019," 2019, retrieved on Feb. 27, 2020, retrieved from URL <https://www.microstrategy.com/getmedia/de71bdb6-6d88-4e62-90d5-0e4a3cf94bb6/whats-new-in-microstrategy-2019>, 138 pages.

microstrategy.com [online], "Your Voice is Your Passport: Implementing Voice-driven Applications with Amazon Alexa," 2018, retrieved on Feb. 27, 2020, retrieved from URL <https://www.microstrategy.com/getmedia/43a66f02-b66c-44c0-ba09-11f7b7514e52/Alexa_World2018>, 33 pages.

prnewswire.com [online], "MicroStrategy 2019, the World's Most Advanced Analytics & Mobility Platform, Powers Decisions for Every Moment of the Day," Jan. 10, 2019, retrieved on Feb. 27, 2020, retrieved from URL <https://www.prnewswire.com/in/news-releases/microstrategy-2019-the-world-s-most-advanced-analytics-amp-mobility-platform-powers-decisions-for-every-moment-of-the-day-867142447.html, 10 pages.

Saylor et al., "Microstrategy World 2019," Event Guide, Presented at Microstrategy World 2019, Phoenix, AZ, Feb. 4-6, 2019 retrieved from URL <http://www.phoenix.fazenda.pr.gov.br/arquivos/File/2019020S_MSTRWorld2019_programa_full.pdf>, 108 pages.

solutionsreview.com [online], "MicroStrategy 2019 Features New HyperCards and Federated Analytics," Jan. 7, 2019, retrieved on Feb. 27, 2020, retrieved from URL <https://solutionsreview.com/business-intelligence/microstrategy-2019-features-new-hypercards-and-federated-analytics/>, 4 pages.

wikipedia.com[online], "Draft: Semantic Graph" Nov. 9, 2018, retrieved on Nov. 15, 2018, retrieved from URL <https://en.wikipedia.org/w/index.php?title=Draft:Semantic_Graph&oldid=868720195>, 5 pages.

zdnet.com [online], "MicroStrategy 2019 introduces "HyperIntelligence" contextual BI" Jan. 7, 2019, retrieved on Feb. 27, 2020, retrieved from URL <https://www.zdnet.com/article/microstrategy-2019-brings-introduces-hyperintelligence-contextual-bi/, 14 pages.

U.S. Office Action in U.S. Appl. No. 16/677,183, dated Apr. 21, 2021, 21 pages.

U.S. Office Action in U.S. Appl. No. 16/677,183, dated Nov. 4, 2020, 17 pages.

Office Action in U.S. Appl. No. 16/450,673, dated Jun. 8, 2022, 15 pages.

Office Action in U.S. Appl. No. 16/677,183, dated May 4, 2022, 31 pages.

Office Action in U.S. Appl. No. 16/677,427, dated May 5, 2022, 37 pages.

Office Action in U.S. Appl. No. 16/678,948, dated Mar. 31, 2022, 17 pages.

Office Action in U.S. Appl. No. 16/514,946, dated Aug. 26, 2022, 15 pages.

\* cited by examiner

PROVIDING INFORMATION CARDS USING SEMANTIC GRAPH DATA

CROSS-REFERENCE TO RELATED APPLICATIONS

This application claims the benefit of U.S. provisional patent application No. 62/801,239, filed on Feb. 5, 2019, U.S. provisional patent application No. 62/801,290, filed on Feb. 5, 2019, and U.S. provisional patent application No. 62/821,132, filed on Mar. 20, 2019. The entire contents of each of the prior applications is incorporated by reference.

BACKGROUND

The present specification relates to providing information cards, including leveraging semantic graph data to manage and present information cards.

SUMMARY

In some implementations, a computing system stores semantic graph data indicating objects and relationships among the objects. Information cards can be represented as objects in the semantic graph. For example, a card object in the semantic graph can represent characteristics of an information card that may be presented when one or more entities are associated with the current context of a computing device. Various aspects of the generation and presentation of information cards can be captured in the card object and connections of the card object in the semantic graph. For example, the card object and/or its connections can indicate an entity or entities about which information cards are generated based on the card object. The card object and/or its connections can also indicate the triggers or conditions (e.g., keywords, contextual factors, etc.) that will cause the information cards to be presented. As another example, the card object and/or its connections can indicate a set of content (e.g., key indicators, metrics, or measures) to provide on the information cards.

In general, an information card refers to a concise set of content describing an entity (e.g., a topic, a person, a place, an object, a company, etc.). In many cases, the information card specifies the most frequently used or most widely relevant pieces of information about an entity (e.g., facts, attributes, statistics, etc.). An information card can thus represent a limited set of information extracted from what is usually a much more comprehensive database or other data repository. An information card may be provided visually on a user interface, but may also be used in other ways. For example, the information card may be used to generate an audible response provided over a voice-response interface. In many cases, the types of content to be included an information card is determined in advance and is standardized for groups or categories of entities. For example, information cards for companies may include one predetermined set of indicators, and information cards for locations may include a different predetermined set of indicators. The card objects in the semantic graph can specify the content of information cards for different categories of entities or individual entities, as discussed further below.

Information cards are typically most useful when they can be provided quickly, with minimal latency perceived by the end user. To enable information cards to be provided very quickly, a computer system can use various caching techniques to make card content readily available. This can include server-side caching and client-side caching, for both card template information and for actual content to be presented in information cards. As an example, a server system can identify objects in the semantic graph that are relevant to the context of a client device, such as objects for topics or entities referenced in a served document or a response to a query. With this information about entities that are or may soon be relevant, the server system can generate and cache information card data for those entities. The server system can also send information card data to the client device to be stored in a local cache of the client device. The client device can maintain an index of cached information card data. Then, when a particular entity becomes relevant to the context of the client device, the data can be found quickly using the index and can be presented quickly. In some implementations, the client device can also pre-emptively generate and store a rendering of information cards, allowing even faster presentation. Using these and other techniques discussed below, information cards can be presented very quickly, often within a few seconds or even less than a second from detection of a trigger that the information card should be displayed.

In one general aspect, a method performed by one or more computers comprises: storing, by the one or more computers, semantic graph data for a semantic graph, where the semantic graph data indicates objects and relationships among the objects, and where the objects include a card object that represents characteristics of an information card; receiving, by the one or more computers, a request from a client device; processing, by the one or more computers, the request from the client device using the semantic graph data; and providing, by the one or more computers, data for the information card to the client device based on the card object indicated by the semantic graph data.

Implementations can include one or more of the following features. For example, in some implementations, the semantic graph data includes data indicating one or more triggers or conditions for presenting the information card.

In some implementations, the one or more triggers or conditions are represented as characteristics of the card object.

In some implementations, the one or more triggers or conditions are represented as one or more connections of the card object with one or more other objects.

In some implementations, the card object represents a template for providing information cards for entities in a category of entities.

In some implementations, the card object is connected, in the semantic graph, to each of multiple objects representing different entities in the category such that the card object can be used to provide an information card for each of the different entities.

In some implementations, the card object is connected to synonym object in the semantic graph, and the one or more computers are configured to provide the data for the information card based on an occurrence of a synonym for an entity name indicated by the synonym object.

In some implementations, the method includes: retrieving, from a data repository or an in-memory data store, a portion of a data set used to calculate a metric for an entity; calculating the metric based on the retrieved portion of the data set; and storing the metric and/or the retrieved portion of the data set in a cache.

In some implementations, the method includes providing, by the one or more computers to one or more client devices, cache data for one or more information cards to populate a cache of the one or more client devices.

In some implementations, the cache data includes layout or formatting information for the one or more information cards, content to be presented on the one or more information cards, or a presentation trigger or condition for the one or more information cards.

In some implementations, the request indicates one or more terms associated with a context of the client device; the method includes determining, based on the semantic graph data, that the one or more terms correspond to the information card represented by the card object; and providing the data for the information card to the client device is based on determining that the one or more terms correspond to the information card.

In some implementations, the method includes: identifying, from among the objects indicated by the semantic graph data, one or more objects referenced in content provided to a client device; and providing information card data for information cards based on card objects connected to the identified one or more objects in the semantic graph.

In some implementations, the request is a query. The method includes: identifying one or more entities that are (i) referenced in the query, (ii) used in generating results to the query, or (iii) in the results generated for the query; and identifying one or more objects in the semantic graph that correspond to the one or more entities. The information card is an information card for one of the identified one or more entities.

In some implementations, the method includes selecting, from among a plurality of indicators associated with an entity, a proper subset of the indicators based on semantic graph data for the card object. Providing the data for the information card includes providing the proper subset of indicators.

In some implementations, the method includes: analyzing access data indicating access to content by a user; selecting, based on the analysis of the access data, a set of objects referenced in the content accessed by the user; and providing, to a device associated with the user, data for information cards corresponding to the objects in the set.

In some implementations, the card object represents an information card for a specific entity.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
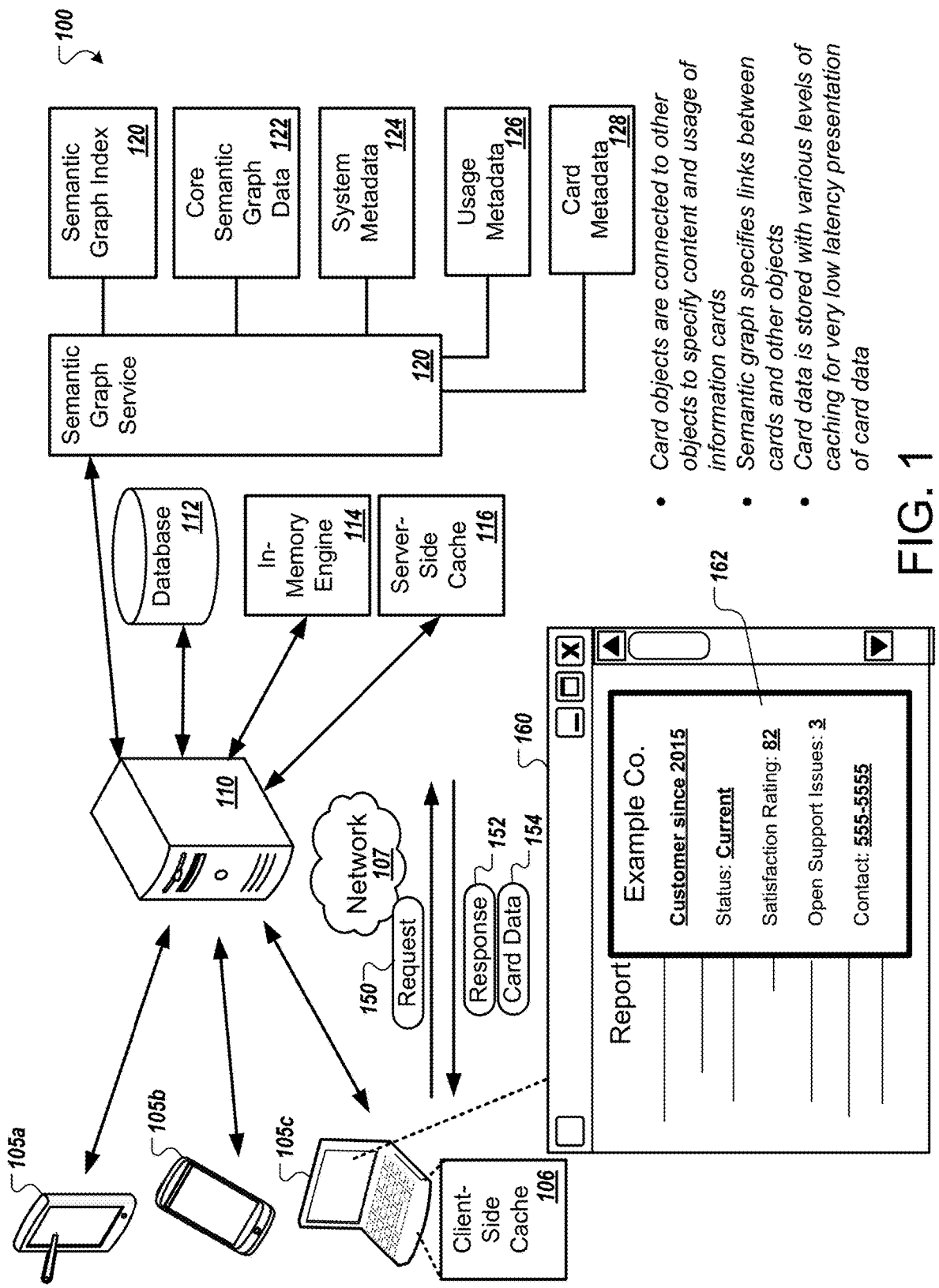
FIG. 1 is a diagram showing an example of a system for providing information cards using semantic graph data.

FIG. 1 is a diagram showing an example of a system 100 for providing information cards using semantic graph data. In the example, a server system 110 provides analytics functions to various client devices 105*a*-105*c*. These functions include providing a semantic graph service 120 that can support may interactions with semantic interpretation and identification of contextually relevant content. In particular, the example of FIG. 1 shows how the semantic graph data can include card metadata 128 corresponding to information card objects in a semantic graph. The card metadata 128 can be used to determine when information cards should be presented and what content should be included in information cards. For example, connections of a card object to other objects in the semantic graph can specify attributes and metrics to be presented in the information cards based on the card object. As another example, a card object can have connections to objects that represent contextual triggers for presentation of an information card. As a result, when one of the objects is present in a context, or a name or other reference to an entity corresponding to the object occurs, the information card can be presented.

The system 100 is also arranged to provide information cards to users with very low latency. For example, when the semantic graph service 120 identifies objects in the sematic graph that are relevant to a context of a client device (e.g., related to a document or query associated with the device), the server system 110 can predictively retrieve and/or generate the information needed to present an information card for those objects. This information can be retrieved quickly using an in-memory engine 114 that uses high-performance memory (e.g., random access memory (RAM) or other low-latency data storage) to store online analytical processing (OLAP) data cubes. The calculation results needed to populate information cards can be performed in advance, with the results stored in a server-side cache 116. For even faster access, the content for information cards, as well as information about layout, formatting, presentation triggers, and so on, can be provided to client devices and stored locally in a client-side cache 106. When an entity becomes relevant to the current context of a client device (e.g., a user action or on-screen content), the data to be presented in an information card is already present at the client device. In this manner, when the appropriate data is in the client-side cache 106, no network round-trip delays are incurred since the client device does not need to request information card data and wait for a response. If the data is not in the client-side cache 106, the server system 110 can still provide it very quickly from the server side cache 116, or generate it from the data in the in-memory engine 114.

In general, semantic information can be used by many types of enterprise systems, such as database systems, OLAP systems, search engines, and others. Traditionally, semantic data is used to translate database table and other data formats into human-readable forms. Semantic data can provide information about the identity of objects, the meaning of different objects, relationships among objects, and so on. For example, semantic information may indicate that a particular column of data represents a particular attribute or metric and may indicate the data type of the data. Semantic data that indicates the categories or types of objects is useful, but labels and classifications alone typically do not indicate the full scope of the complex interactions, relationships, and histories among objects.

In general, the semantic graph provides an ability to better provide personalized, contextualized information from what otherwise may be a sea of static and flat data without the semantic graph and associated metadata. A semantic graph can indicate enhanced relationships between objects. For example, the semantic graph can include different weights for connections between objects, and the values of the weights can vary dynamically over time. In addition, the semantic graph may indicate multiple different types of connections between objects, as well as specifying directionality of the connections.

The semantic graph and associated metadata can be used to automatically generate personalized recommendations and content to end users, for example, based on the identity of the user and the user's current context. The semantic graph can be used to associate objects with telemetry information, such as usage information that indicates how objects are used, how often objects are used, who the objects are used by, and so on. The relationships modeled with the semantic graph can be varied and complex. Even for only two objects, there may be a multi-dimensional connection between them with different weights representing strengths of different relationships or properties. In this sense, there may be multiple connections between objects representing different types of relationships or different aspects of a relationship (e.g., one weight for co-occurrence frequency in documents, another weight for a degree that one object defines the meaning of the other, another weight for how commonly objects are accessed by the same users, and so on). The weights for the connections dynamically adjusted over time. With this information, applications can better identify which objects out of a large set (e.g., thousands, millions, or more) are most important and most related to each other.

Many different types of objects can be identified and characterized using the semantic graph. For example, objects may represent data sources, data cubes, data tables, data columns, data fields, labels, users, locations, organizations, products, metrics, attributes, documents, visualizations (e.g., charts, graphs, tables, etc.), and many other data items or concepts.

Usage information can be stored for each object, as well as for each user. The semantic graph may be interpreted differently for each user. For example, the user context (e.g., the identity, permissions, and usage history for the current user) can provide a personalized lens to interpret the data. User information can be used to adjust the weights in the semantic graph to alter search results, recommendations, application behavior, and other aspects of the user's experience. As discussed below, other types of context can also be captured and stored, such as data indicating a user's geographic location, the identity of a user's device, a device type or capabilities of the user's device, a time of day, an identity of another user or device nearby, an application open on the user's device, text on a user interface, a current task or workflow, keywords of recent queries or recently viewed documents, and so on.

The semantic graph can also indicate weights for levels of security, access restrictions, and trust for objects. For example, the semantic graph data can indicate the status of certain objects being certified or not, as well as the level of certification and the authority that provided the certification. Certified content is often more useful than content that is not certified, and so application content can give higher weight or higher preference to certified content. In general, the connections and weights for the semantic graph can indicate higher weights for higher-quality content.

The semantic graph provides a framework to integrate various different types of data from different sources, e.g., presence data indicating locations of users, access control data indicating user privileges, real-time application context, user interaction histories, query logs, and so on. Further, the relationships between objects are not limited to a particular use or domain. For example, the usage information and history that is generated from user-submitted search queries and responses can affect the weights between objects used for much more than carrying out searches, e.g., also for personalizing an interface for document authoring, for system performance tuning, for recommending documents, and more.

The semantic graph, through the various associated weights for connections between objects, provides a very useful way for a system to understand the relative weights between objects. In many cases, the meanings of different items and their relative importance is revealed over time through usage information, such as the frequency with which that users use certain objects together in document or a particular visualization. The overall amount of use of different objects (e.g., number of accesses over a period of time) is also a strong signal that can be used to rank objects relative to each other.

As users interact with an enterprise platform, they contribute information and meaning to the semantic graph. As an example, a database may have a column labeled "EFTID," and the user may know that values in the column represent a unique customer unique ID. The system obtains new information about the meaning of the column as the user interacts with the data, for example, by renaming the column, referencing the data in a visualization, using the data in an aggregation or along an axis, etc. The understanding and context that the user has (e.g., by understanding the meaning of the data) can be at least partially revealed to the system through the user's use of the data over time. The system uses the usage data to capture these indications of meaning and feeds them back into the graph, e.g., through adjusting connections between objects and adjusting weights for connections. A number of contextual cues from user actions can be identified by the system and used to update the semantic graph and optimize the operation of the system.

Information in the semantic graph and associated metadata can be stored on a user-by-user basis and/or at other levels of aggregation (e.g., by user type, by organization, by department, by role, by geographical area, etc.). Usage information is often stored on a per-user basis to indicate the particular actions users take and items viewed. Users can also be grouped together and their respective usage information aggregated. For example, users may have data in the semantic graph indicating their attributes, such as their organization, department, role, geographical area, etc. The system then uses that information to determine the overall usage patterns for a group of users. For example, to determine usage patterns for users in a particular department, the system can identify user objects in the semantic graph that have a connection of a certain type (e.g., a "member of" connection) to the particular department. With this set of users, the system dynamically combines the sets of usage data for the individual users identified. In this manner, the system can aggregate usage logs, system performance data, and other information at any appropriate level as needed.

In the example of FIG. 1, a server system 110 provides analytics functions to various client devices 105a-105c. The analytics functions can include serving documents, answering database queries, supporting web applications, generating documents (e.g., reports, dashboards, etc.), and so on. The server system 110 can include one or more computers, some of which may be remotely located or provided using a cloud computing platform. The server system communicates with the client devices 105a-105c through a network 107.

The server system 110 has access to a database 112 that stores data that is used to provide the analytics functions. For example, the database 112 may store documents, data sets (e.g., databases, data cubes, spreadsheets, etc.), templates, and other data used in supporting one or more analytics applications. Information from the database 112, such as OLAP data cubes, can be stored in the in-memory engine 114 for faster access.

The server system 110 stores data for a semantic graph, which can include, among other data, a semantic graph index 120, core semantic graph data 122 (e.g., including object definitions, semantic tags, identifiers for objects and connections, etc.), system metadata 124, and usage metadata 126.

The semantic graph data can include card metadata 128, which may be stored together with or separately from the core semantic graph data 122. For example, the core semantic graph data 122 can include definitions of different types of objects, including card objects, as well as indications of the instances of different objects, including different card objects. The core semantic graph data 122 can also indicate the edges or connections between the objects in the graph. This same type of data may additionally or alternatively be stored as separate card metadata 128. In addition, the card metadata 128 can include more detailed or extensive information about individual card objects, such as presentation templates indicating layout and formatting characteristics, and/or presentation triggers and information defining the behavior of information cards.

The system may be arranged to provide access to the semantic graph through a semantic graph service 120. For example, the system may provide an application programming interface (API) allowing software modules to look up different information from the semantic graph. The semantic graph and associated metadata can be stored in various formats. As an example, a core set of structured metadata identifying objects and their properties can be stored in a database. Additional associated data can be stored in the same manner or at other locations. For example, a high-speed storage system can store and update usage metadata, system metadata, and other types of information that are constantly being updated to reflect new interactions. This metadata can be associated or linked to the core structured metadata for the objects by referencing objects through the identifiers or other references defined in the core semantic graph structured metadata. The semantic graph service 120 may then provide information to influence various other functions of the enterprise system, such as a search engine, a content recommendation engine, a security or access control engine, and so on. Although the storage of the semantic graph data and associated metadata may be stored at diverse storage locations and across different storage systems, the semantic graph service 120 provides a unified interface for information to be delivered. Thus, the service 120 can provide access to diverse types of data associated with the semantic graph through a single interface. The semantic graph service 120 can provide a consistently available, on-demand interface for applications to access the rich interconnectedness of data in an enterprise system.

As an example, a query response engine can submit a request to the semantic graph service 120 that indicates a certain context. The context information may indicate, for example, user context (e.g., a user identifier), location context (e.g., GPS coordinates or a city of the user), application context (e.g., a document being viewed), or other contextual factors. In some cases, the request indicates one or more context objects (e.g., user objects, location objects, document objects, etc.) and the semantic graph service 120 provides a list of the related objects and scores of how relevant the results are to the context objects. If a recommendation engine submits a request for results of a certain type (e.g., documents, media, etc.) given a certain context, the semantic graph can provide results that identify objects selected based at least in part on the particular usage history and other data associated with the context. The semantic graph service 120 may use both general weights and usage information, e.g., across all users, as well as specific weights and usage information tailored to the context. For example, all using data may be used to define a general weight that is used for a connection in the semantic graph when no specific context is specified. When a user context is specified, the general weight may be adjusted based on user-specific usage data and weightings. Thus the results from the semantic graph service 120 can blend general and context-specific information when appropriate. Of course, if specified in a request or for certain types of requests, responses for a context may be generated using only metadata relating to the context in some implementations.

Referring still to FIG. 1, the server system 110 can receive a request 150 from a user device 105c. As noted above, the request 150 can be a query, a request to serve a document, a request to retrieve information from a data repository, or another type of request. The server system 110 answers the request using, at least in part, the semantic graph service 120, which provides an indication of objects that may be relevant. These objects may refer to, for example, documents provided as search results, names of people, companies, locations, or other entities provided as answers to a question, or items shown on a chart, graph, or other data visualization. The server system can use the objects identified in generating a response 152 to the request 150 to also generate and provide card data 154 that enable the client device 105c to quickly present information cards.

The semantic graph, as specified by the core semantic graph data 122, can indicate objects and connections between them. With the set of objects identified as relevant to the request 150, the response 152, or other context data for the client device 105c, connections to card objects can be identified. For example, the server system 110 or the semantic graph service 120 can trace the connections indicated by the semantic graph data 122 to identify all card objects that have at least a minimum type of connection to the relevant objects. The set of card objects can be those determined to have no more than a maximum distance from a relevant object, e.g., in terms of number of connections between a relevant object and a card object and/or a weight or strength of connection between them. Once the set of card objects is identified, additional data for those card objects can be obtained from the card metadata 128, for example, to select the presentation templates that describe layout and formatting for the card, to obtain lists of triggers for presentation of the card, and so on.

Card objects may specify information card characteristics in various ways. In some implementations, each card object represents the card characteristics to be used for information cards for all entities of a certain type. For example, one card object represents the characteristics to be used for generating information cards for companies, another card object represents the characteristics to be used for generating information cards for locations, another card object represents the characteristics to be used for generating information cards for locations, and so on. In this manner, the card object can act as a prototype or template for a group of potential information cards. Similarly, to create an information card for a specific entity, e.g., a specific instance of an information card, the various field or information types specified by the card object need to be calculated and filled.

To generate an instance of an information card for a specific entity, further information from the semantic graph is obtained. For example, the information card may specify certain types of information, which may then be obtained through the connections in the semantic graph. For an information card for employees, the card object may specify that a name, phone number, department, and years of service are elements to be included. An employee object for a specific employee may have a connection in the semantic graph to this card object. To generate the data for an information card for the employee object, the server system 110 can identify the card object, determine the fields or information types the card object specifies, and then retrieve those data items from the employee object or the other objects connected to the employee object.

Once the data for an information card instance is obtained, the server system 110 stores it in the server-side cache 116. The card data can be stored in association with the entity name or other identifier for the entity described by the information card. The card data can also be associated with the card object and entity object in the semantic graph.

In the example, the server system 110 send the response 152 to the request 150. The server system 110 also sends card data 154 for information cards that are relevant to the context of the client device 105c, as determined above by finding objects in the semantic graph that are related to the request 150, the response 152, or other context information for the client device 105c (e.g., a user identifier for the user, a history of recent accesses by the user or the device 105c, accesses of others nearby or in the same department, messages received or sent by the user, etc.). The card data 154 may include information such as the values to be presented in information cards, layout and formatting for information cards, an indication of rules or triggers for presenting the information cards, and so on.

The client device 105c stores card data in the client-side cache 106 where it is available for rapid retrieval and presentation. The stored card data 154 can indicate information used to trigger presentation of the information cards. For example, the stored card data 154 can indicate keywords that, when found on a user interface or interacted with by a user trigger display of the content. When the client device 105c determines that one of the presentation triggers has occurred for an information card, the client device 105c identifies the appropriate card information from the client-side cache 106 and renders an information card 162 for display on a user interface 160.

Figure 2:
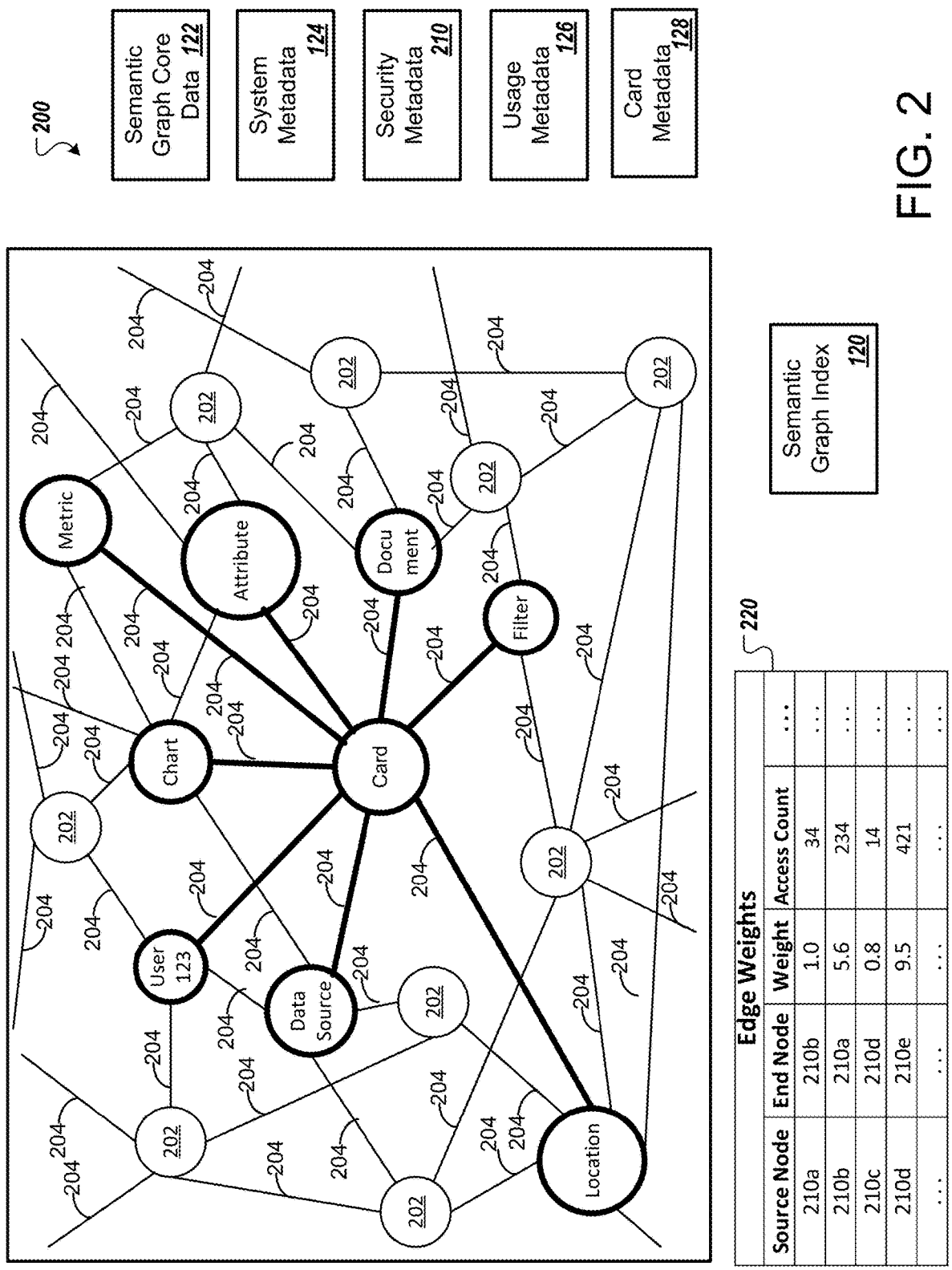
FIG. 2 is a diagram showing an illustration of a semantic graph.

FIG. 2 illustrates an example illustration of a semantic graph 200. Objects are illustrated as nodes 202 and relationships or connections between the objects are illustrated as edges 204. Each node 202 can have a variety of information stored to describe the object it represents, e.g., an object type for the object, a location of the object (e.g., in a file system), an identifier for the object, attributes for the object, etc. The nodes 202 and edges 204 that identify the objects and their connections may be stored in the semantic graph core data 122, along with definitions, semantic tags, and more.

The edges 204 have weights 220 associated with them, e.g., values indicating magnitudes or strengths of the respective connections. Other information indicating the nature or character of the edges 204 can also be stored. Although the illustration only shows one edge 204 between each pair of nodes, there may be multiple different relationships between two objects, which may be represented as, for example, multiple edges 204 with different weights or an edge with multiple dimensions or aspects. In some implementations, an edge 204 and an associated weight represents an overall affinity of objects. In some implementations, Different edges 204 may represent different types of relationships, e.g., dependency (e.g., such as a document requiring data from a data source), co-occurrence, an object being an instance of a class or category, an object being a part of another object, and so on. Edges 204 may be directional. For example, the weight or strength of connection from Object A to Object B may be greater than the weight from Object B to Object A.

The semantic graph 200 has various types of metadata that describe aspects of the objects and connections. The system metadata 124 can indicate the configuration of the system and performance measures. This metadata can be generated and stored for each device or module of an enterprise system, e.g., client devices, content servers, database servers, individual applications, etc. The usage metadata 126 can include records of the accesses made throughout the system to any of the objects represented in the semantic graph 200, as well as the nature or type of access. Security metadata 210 can indicate security policies, permissions and restrictions, histories of security decisions (e.g., to grant or deny access) and so on. The Opinion metadata 212 can indicate explicit or inferred opinions and preferences of users. For example, the opinion metadata 212 can store information about sentiment derived from user actions or user documents, preferences for some items over others, and so on. These types of metadata and others can be associated to identifiers for specific nodes 202 and connections 204, allowing the semantic graph to store information about specific instances of how nodes 202 and connections 204 were accessed.

The system metadata 124, usage metadata 126, and other types of metadata can be log files that show historical information about how an enterprise system operated and how it was used. In some implementations, the metadata is received as real-time or near-real-time telemetry that is measured, logged, and reported as transactions occur. For example, the metadata can collect and store a stream or feed of information from client devices, databases, query processing modules, web servers, and any other component of the enterprise system. Thus, the information can be used to detect performance limitations or emerging trends in usage as they occur and with a very fine-grained level of precision. The telemetry can indicate individual requests, transactions, and operations. In some implementations, some aggregate measures can also be provided, such as an overall load level of a device.

As discussed above, a semantic graph can be a logical layer of software that describes information stored in data systems using human-readable terms and provides metadata that can aid analysis of the data. One of the primary functions is to provide people with way to query databases using common business terms without having to understand the underlying structure of the data model.

A semantic graph can store or have associated with it (i) metadata describing the data in human-understandable terms along with (ii) usage data about how often the data is accessed, by whom, and relationship data about how objects are used together in analysis scenarios. There are a number of objects and metadata that may be stored as part of a semantic graph implementation: data objects, content objects, user objects, usage metadata, security metadata, system metadata, a semantic graph index, opinion metadata, and action objects.

Different vendors often different terminology for similar concepts. For example, a "dimension" or "attribute" for a data object may both represent the same or similar concept, e.g., a value that represents a property of a data object. Similarly, a "measure" or "metric" in a data set may both refer to the same or similar concept, e.g., a value that provides quantitative indicator, such as a result of a calculation or function.

Data objects in the semantic graph can refer to objects that appear to users as business concepts. For example, "customers", "products", "revenue" and "profit" are all common data objects in the semantic graph. A user will typically see those data objects in a user interface and can query the underlying database by interacting with the data objects. For example, a user may query the database by requesting "customers" and "revenue". The system will then query the database (or in many cases, multiple databases) to fetch the customer revenue data. Querying the system usually requires a number of complex database calls using SQL, MDX or APIs. From a user perspective, however, the complexity of how the data is stored, and the sophisticated query required to retrieve the results are automatically handled on behalf of the user.

Common types of Data objects include dimensions, measures, groups and sets, hierarchical structures, filters and prompts, geographic objects, date and time objects, and synonym objects. Dimensions (Attributes)—Dimensions and Attributes both refer to data that is typically (but not always) a noun, such as "Customer", "Product", "Country", or "Account". Dimensions can also have additional metadata associated with them to qualify them further. For example, a Dimension object can have further metadata describing it as a Person, which can, in turn, have further metadata describing the Person as being of type Employee.

Measures (Metrics or Key Figures)—Measures and Metrics both refer to data that would typically be used for calculations such as "Revenue", "Profit", "Headcount", and "Account Balance". Measures can also have additional metadata further describing how the Measure behaves. For example, additional metadata can describe whether bigger values or smaller values are "good" or whether a Measure represents a "currency".

Groups and Sets—Groups and Sets refer to objects in the semantic graph that represent grouping of data elements. For example, the "Top 10 customers" may be a group that represents the top Customers by some measure (for example Revenue). Groups and Sets can be a simple grouping such as "My Customers=Company 1, Company 2, and Company 3" or a rules-based grouping such as "My Top Customers=top 10 Customers by Revenue for Year=2018".

Hierarchical structures—Hierarchical structures provide metadata about the relationship between objects and object values in a semantic graph. For example, one such hierarchical structure may describe a Parts hierarchy where certain products are made up of parts.

Filters and Prompts—Filter and prompt objects provide a means to define variables that need to be set either by the programmer, system or end user prior to execution of the object. For example, a semantic graph may have a "Region" filter or prompt whose value must be defined prior to executing the query or content object that it is associated with.

Geographic objects—Geographic objects are objects associated with geographic concepts such as countries, regions, cities, latitude and longitude. Geographic metadata helps the consuming user or system map or perform geospatial calculations using the objects much more easily.

Date and Time objects—Date and Time objects are a special classification of objects that are associated with Dates and Times. This can be used for time based calculations (year over year analysis) or for displaying the object data on Date and Time-based output such as calendars.

Synonym objects—Synonym objects are a special classification of dimension and attribute objects that store alternate values to the values in the dimension objects. This is useful in cases where there are multiple common terms that are used to map to a specific value in the database. For example, in common usage, Coke and Coca-Cola are often used interchangeably when searching for information. The Synonym object stores such alternate values and maps them to a common value in the database.

Content objects in the semantic graph refer to content that is typically displayed to end users as an assembly of data objects. Content objects include:

Reports—Report objects are highly formatted, sectioned and paginated output such as invoices, multi-page tables and visualizations.

Dashboards—Dashboards objects are similar to Report objects in that they also display data and have formatting and visualizations. Dashboards differ from Reports in that they tend have summary data and key performance indicators instead of detailed pages of information.

Tables and Grids—Tables and grids represent data in tabular format (with rows and columns). Tables and grid often are included in Reports and Dashboards.

Visualizations—Visualization objects illustrate data in charts such as bar, pie and line charts.

Cards—Card objects store the key information for a specific topic and are built to augment and overlay third party applications with analytic information in the context of the user.

User objects are people, groups and organizations that are represented in the semantic graph. These objects represent user accounts and groups of user accounts and are used to provide system access, security and rights to other objects in a semantic graph. Users are particularly important in the semantic graph because they are the actors in the system that create, interact with, and use the other objects in the semantic graph. A semantic graph provides an understanding of the relationship between users and the objects in the semantic graph as well as the relationships between the users themselves.

Usage metadata is information stored in a semantic graph about the usage of the objects in a semantic graph. This additional usage data provides information about which objects are used by which users, which objects are used together and which objects are the most and least popular in the system. Usage metadata also contains the context of the user when she interacted with the system. For example, what type of device she was using, where she was, and what data context she was in. This usage metadata, in addition to the other metadata in a semantic graph, provides a means to find relevant information for different users and usage context. Usage metadata is the primary differentiator between a semantic layer and a semantic graph. While a semantic layer primarily describes data in business terms and provides relationship information between the objects as a means to map these business terms to database queries, a semantic graph stores usage information to provide additional information about the weight of the relationships between objects in the semantic graph. Usage metadata can also contain information about when and where objects are accessed.

Security metadata is information stored in a semantic graph about which users have access to which objects, which privileges they have on the objects, and which data they have access to. The Security metadata can also contain special concepts such as whether the objects are certified, contain personally identifiable information or contain sensitive information.

System metadata is data about how the objects in the system perform. This can include system information such as error rates and run times for the objects. This information can be used by users and system processes to optimize performance of the system. For example, the system can automatically notify content authors if their content is experiencing slow load times or high error rates. The system can also use the system metadata in the semantic graph to automatically perform maintenance to improve performance of content. For example, if a content object has slow performance and there are many users that access that content on a predictable basis, the system could potentially automatically schedule execution of the content and cache the results so as to provide users with improved performance.

A semantic graph index indexes key values in the semantic graph so as to provide fast search and retrieval times. These key values may be a variety of types of information, such as keywords, semantic tags, object or node identifiers, connection or edge identifiers, and so on.

Opinion metadata is opinion information about the objects in a semantic graph that is provided by the end users. For example, users could give a 'thumbs up' or 'favorite' content to indicate that they like or find it useful. Other mechanisms such as a star system or commentary can also be employed as means of storing opinion metadata in a semantic graph. Opinion metadata is useful alongside usage metadata and affinity between objects to help find content that is both relevant to the user's context and of value based on opinion.

Action objects describe actions that can be taken on other objects in a semantic graph. For example, there may be an Action object that takes a Date and Time object and converts it from one format (24 hour) to another (12 hour).

A semantic graph can provide a number of benefits. For example, a primary goal of the semantic graph is to make access to complex business data systems easy for people without database or programming skills. The semantic graph can provide common naming and semantics to represent complex data models with otherwise obscure or non-human-readable names. The semantic graph can provide or support various services built atop it (for example, search or machine-learning-driven recommendation services) with metadata, relationships, and user-based context information that can help answer user questions and recommend the most relevant content to users. The semantic graph can include (or have associated with it) security and audit information to help secure data assets based on user security access profiles.

Usage data associated with the semantic graph can allow an enterprise system to aggregate the data in various ways, and then use the aggregated data to generate customized recommendations, search results, predictions, user interfaces, and other outputs. For example, to respond to a user's search query, the system can use the semantic graph data to identify objects of a particular type or those associated with certain keywords or attributes. Then, for each of the identified objects, the system can then aggregate the usage data for the object. This can include a weighted combination of usage measures, for example, one that weights more highly the instances of use by the current user but still takes into account usage by other users. The weighting can take into account the similarity between the current context of the user and the context of prior uses, with higher similarity resulting in higher influence in the combined score. In addition, a weighted combination can also include components reflecting levels of use of other similar objects and actions, such as an aggregation of usage measures among other objects of the same type or other objects hosted by the same server.

With aggregated usage measures, the system can generate custom weightings for connections between objects. These custom weightings can be adjustments of the general edge weights of the semantic graph. Custom weightings can be determined for each request or transaction with the social network service, so that for each user and even for each different request involving the same user the weightings and thus outputs of the semantic graph service 120 may be different. The output of the semantic graph service 120 can include an identification of objects that are responsive to or relevant to the query it receives. An enterprise analytics system may then use the identification of objects to perform a number of actions, such as select search results (e.g., to a user's query to the analytics system), adjust the rank of search results, adjust a user interface (e.g., to select, rank, or arrange objects for view, such as to select items dynamically populated in a menu), provide recommended content, and more.

Figure 3:
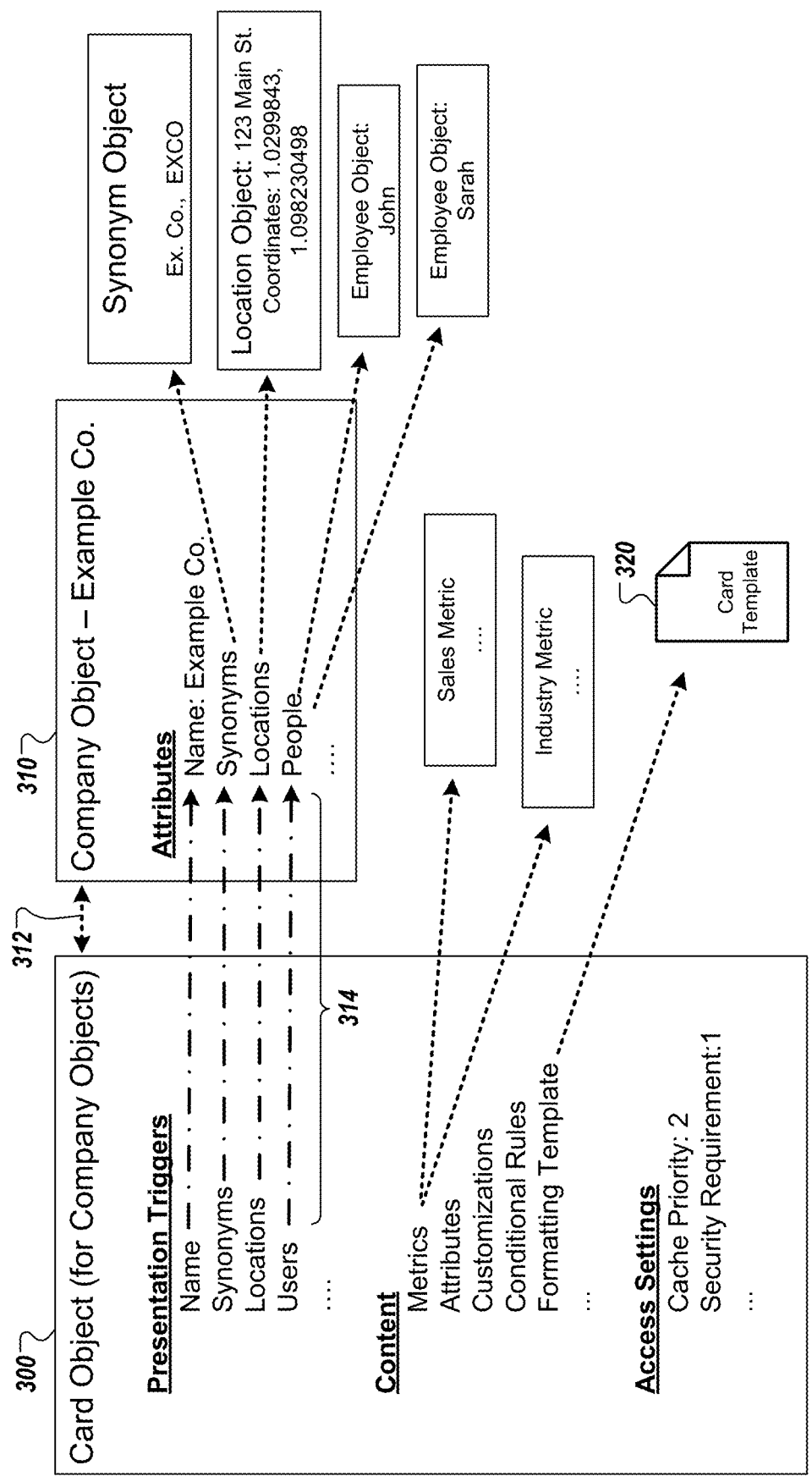
FIG. 3 is a diagram illustrating example data for a card object of a semantic graph.

FIG. 3 is a diagram illustrating example data for a card object 300 of a semantic graph. The card object 300 includes several different types of information, which are shown for purposes of example and are not required for all card objects. In this example, the card object 300 has several types of data that are presentation triggers, such as an entity name, synonyms for the entity name, a location, and users. For example, if the card object 300 is used to define information cards for companies, the name can be a company name, the synonyms can be abbreviations for the company name, the location can be a headquarters for the company or any of several business locations, and users may be employees or contact people for the company. This information may be obtained using connections in the semantic graph.

As an example, a company object for a particular company, "Example Co.," can have a connection 312 to the card object 300 in the semantic graph. Based on these connections, the semantic graph service 120 or the server system 110 can identify information in the company object 310 that corresponds to fields of the card object 300. These connections 314 are not necessarily formally specified in the semantic graph connections, but can be determined based on the attribute or metric labels, data types, and other information. For the company name, the information is specified directly in the company object 310 or its associated metadata. However, the company object 310 defines other information, such as synonyms, locations, and employees through connections to other objects in the semantic graph. Thus, the semantic graph can follow those connections to the other objects that provide the needed information.

In the example, the presentation triggers specify when the information card will be considered sufficiently relevant to present to a user. Here, the card object 300 and the company object 310, with the other connected objects, indicate that the information card should be presented if (i) the name "Example Co." or its synonyms "Ex. Co." or "EXCO" occur, (ii) if the location is within a threshold distance from the location specified by a specific location object, (iii) or if employees John or Sarah are referenced or are nearby.

The card object 300 also indicates the content to be presented in the information card. This can indicate metrics (e.g., results of calculations performed on data), attributes (e.g., values from data sets), and customizations or conditional rules that affect how the information card is presented (e.g., altering appearance and content based on what information is available, or what the current client device context is). In addition, the content can specify a presentation template 320 that specifies layout, formatting, and other data describing how to visually present the information card.

As another example, the card object 300 can specify access settings that determine who has access to the card. Some cards may be made available only to certain users or users in certain groups or departments. In some cases, different users or groups of users may define their own card objects to be used in different ways.

Figure 4:
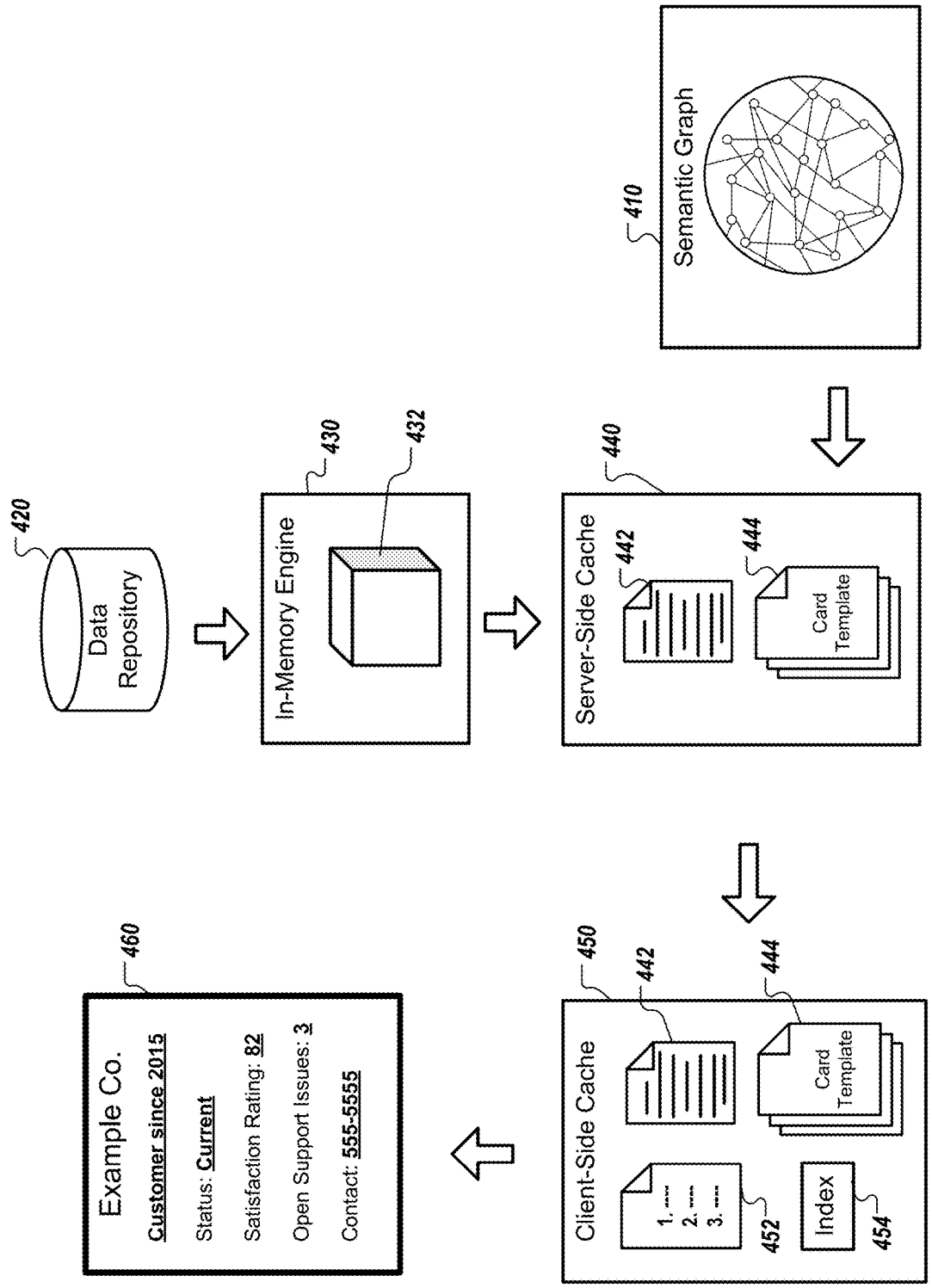
FIG. 4 is a diagram illustrating a process of providing an information card.

FIG. 4 is a diagram illustrating a process 400 of providing an information card. The example shows an overall information flow that can facilitate rapid presentation of information cards. The techniques discussed can be used by the server system 110 of FIG. 1 or another computer system.

A semantic graph 410 stores card objects and other objects as discussed above. The connections in the semantic graph can specify which card objects are used to generate cards for which entities. In addition, or as an alternative, card objects may be associated with an object type, and a card object may be used for objects of the specified type. As another option, some card objects may represent specific cards of specific entities rather than the card characteristics of cards for all entities in a category. As discussed above, the connections between card objects and other objects can specify which other objects to extract content from in order to populate an information card.

Once an entity object is identified, and its associated card object is also identified, the objects are used to determine which additional objects in the semantic graph are needed to complete the set of indicators or other information will appear on the information card. This can involve traversing or searching the semantic graph to find further objects or data elements that provide the data that the card object indicates is needed. Those objects will frequently lead to metric objects and attribute objects that represent data from data sets and/or calculations made based on data. Accordingly, the system can access a data repository 420 to retrieve the data set(s) needed to obtain the values for the information card. For improved speed, the data set(s) can be loaded into an in-memory engine 430 for faster processing. Here, an OLAP data cube 432 or other data representation that facilitates fast retrieval can be used.

The system calculates the content 442 to be presented (e.g., numbers, text, visualizations, etc.) in the information card and stores it in the server side cache 440. This content 442 can represent the fully calculated values to be presented, e.g., key indicators, statistics, description, and so on. The server side cache 440 can also store card templates 444, e.g., presentation templates that indicate the layout and formatting (e.g., size, color, font, organization of content, etc.) for various types of information cards. By populating an information card template 444 with the content 442, a complete information card can be generated.

The information in the server-side cache 440 can be selectively provided to different client devices. The server system may generate and periodically refresh the information card content 442 for many different information cards, but provide just a subset of those to each client device, depending on the context and usage history for the client devices and their users. For example, the server-side cache 440 may store the content 442 for thousands of information cards for the most commonly referenced entities across many users of an enterprise. However, the server system may push to client devices, in cache updates for a local client-side cache 450, a much smaller number, such as the content 442 for the top one hundred most relevant information cards for that user or context. As the context of a client device changes, and as additional requests and information are received from the client device, the server system can send new cache updates that change the content stored at the client device.

At the client device, the client-side cache 450 stores the information card content 442 and presentation templates 444 from the server system. The client device can also generate renderings 452 of information cards, e.g., renderings of content 442 plus the corresponding presentation template 444 to create a complete information card. These renderings 452 can be stored and retrieved for very rapid display. The client device can also create and maintain an index 454 of the card information in the cache, as well as presentation triggers for other cards, for rapid determination of when a card should be presented and whether the cache includes the information to provide the information card. When an appropriate presentation trigger is detected, the client device can provide the information card 460 on a user interface, for example, by showing the rendering 452 or by generating a new rendering.

Figure 5:
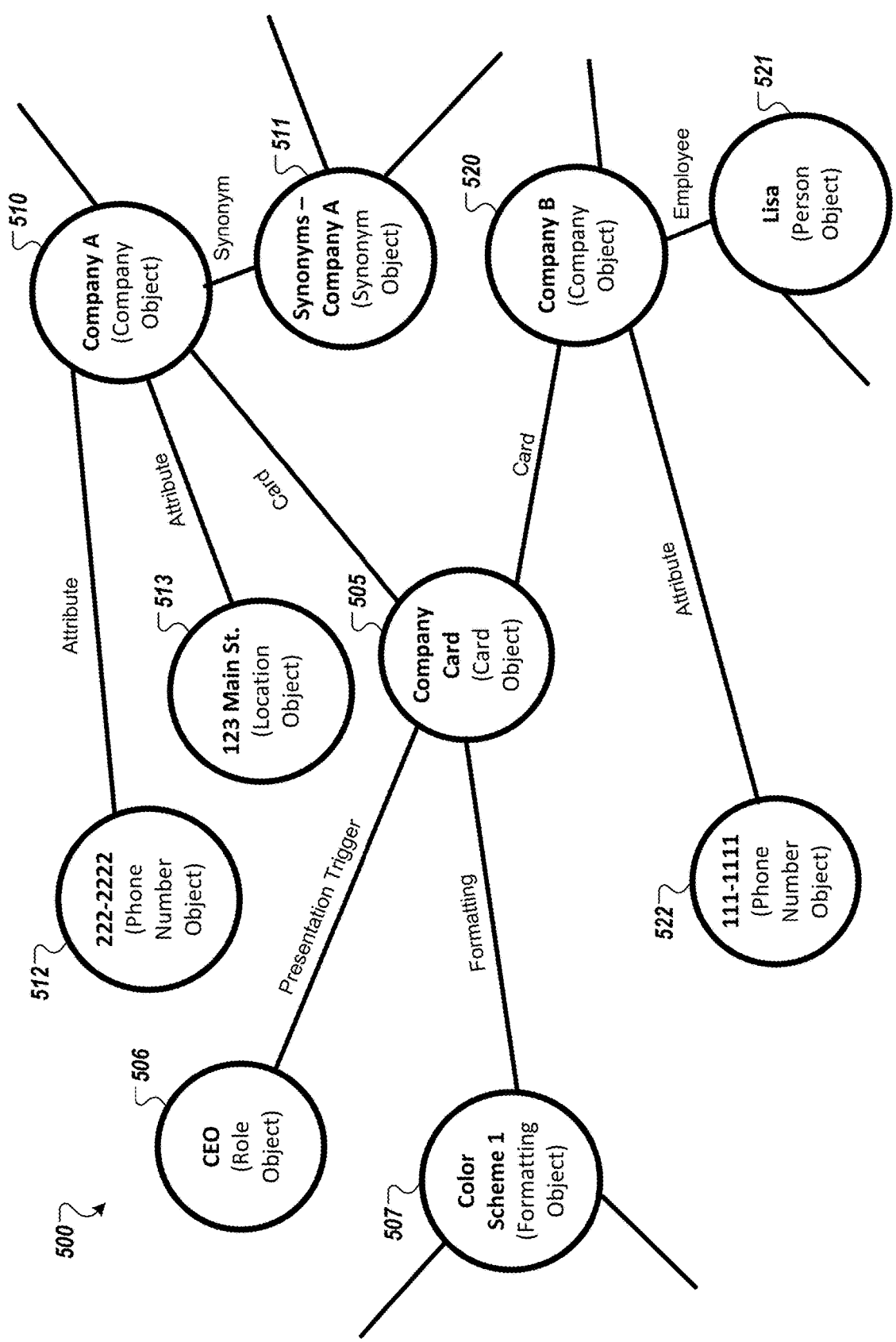
FIGS. 5 and 6 are diagram illustrating examples of objects and connections of semantic graph.

FIG. 5 is a diagram illustrating examples of objects and connections of a semantic graph 500. The semantic graph 500 shows different types of objects as well as different types of connections that indicate how the objects are related and how the various objects will interact to provide information cards.

In the example, a card object 505 represents an information card for a category or type of entity. In this sense, the card object 505 serves as a template for multiple different entities of a particular type. The card object 505 or associated metadata can specify the indicators or types of information elements to be included in information cards generated based on the card object 505. In this case, the card object 505 represents an information card for companies. It is connected to company objects 510, 520, which indicates that when a card should be shown for one of these companies, the card object 505 and its associated information should be used to create the card. In some implementations, no explicit link between card objects and their corresponding entities are needed, and the system can simply store data indicating that entities of a particular type have cards defined using a particular card object.

The card object 505 can be connected to other objects that indicate how and when information cards based on the card object 505 will be provided. For example, the card object 505 may be connected with a formatting connection to a formatting object 507, which in this example specifies a color scheme to use in generating an information card. As another example, the card object 505 is connected to a job role object 506 with a presentation trigger connection. This specifies that the associated object or data it represents is a trigger that a card based on the card object 505 is relevant to the current context. For example, the connection to the job role object 506 indicates that when the CEO of a company is mentioned (e.g., the name of the person holding the CEO role), the company information card should be generated and shown for the company for which the person is CEO. Thus, if a person named John Doe is the CEO of Example Corporation, and an object for John Doe occurs in results from the semantic graph service or in other context (e.g., shown on screen at a client device, included in results to a user's query, present in a calendar entry for a user, included in a document or metadata of a document, etc.), then this occurrence of John Doe can cause the system to generate and present an information card for Example Corporation.

The various company object 510, 520 can have connections to other objects representing attributes, metrics, associated people, locations, products, and other items. In this case, the company A object 510 is connected to a phone number object 512 which is specified as a phone number for company A through the attribute connection. Similarly, the location object 513 is indicated to be a location for company A by virtue of its connection of the attribute type to the company A object 510. The synonym object 511 specifies synonyms for the name company A and is connected with a synonym type connection. Similarly, the company B object 520 has a phone number object 522 specified as an attribute, as well as a person object 521 specified as representing an employee of company B.

When an information card is created based on the card object 505, the system can use the semantic graph connections to determine the content and formatting of the information card. For example, when the name of company A occurs in search results, the system can identify the card connection to the card object 505 and thus identify which object provides the definition of which information elements (e.g., attributes, metrics, etc.) to include in the card. The card object 505 may indicate, among other things, that information cards for companies include a phone number and an address. As a result, to generate the information card for company A, the system can use the attribute connections to locate the attribute objects 512, 513 that respectively provide the phone number and address for the company, and the system can use the values from the attribute objects 512, 513 to populate the information card. In this manner, the system uses connections through the respective company objects 510, 520 to obtain the objects, values, and/or other information needed to fill out the information card template represented by the card object 505, even though the objects are not directly connected to the card object 505. From the connection of the card object 505 to the formatting object 507 and/or other formatting objects, the system determines how the card should be formatted, e.g., size, color, font, style, layout, and so on.

Figure 6:
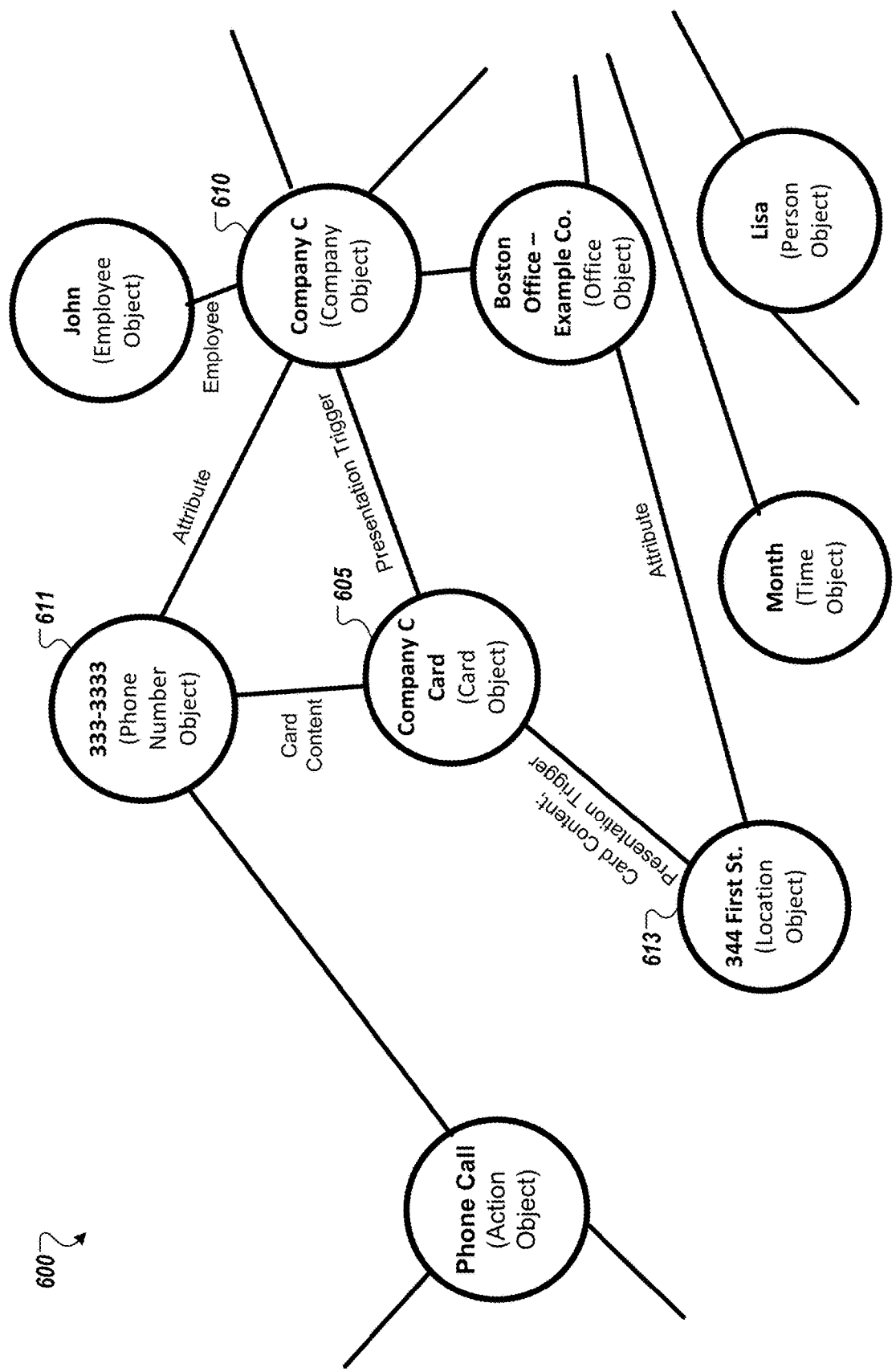
Figure 7:
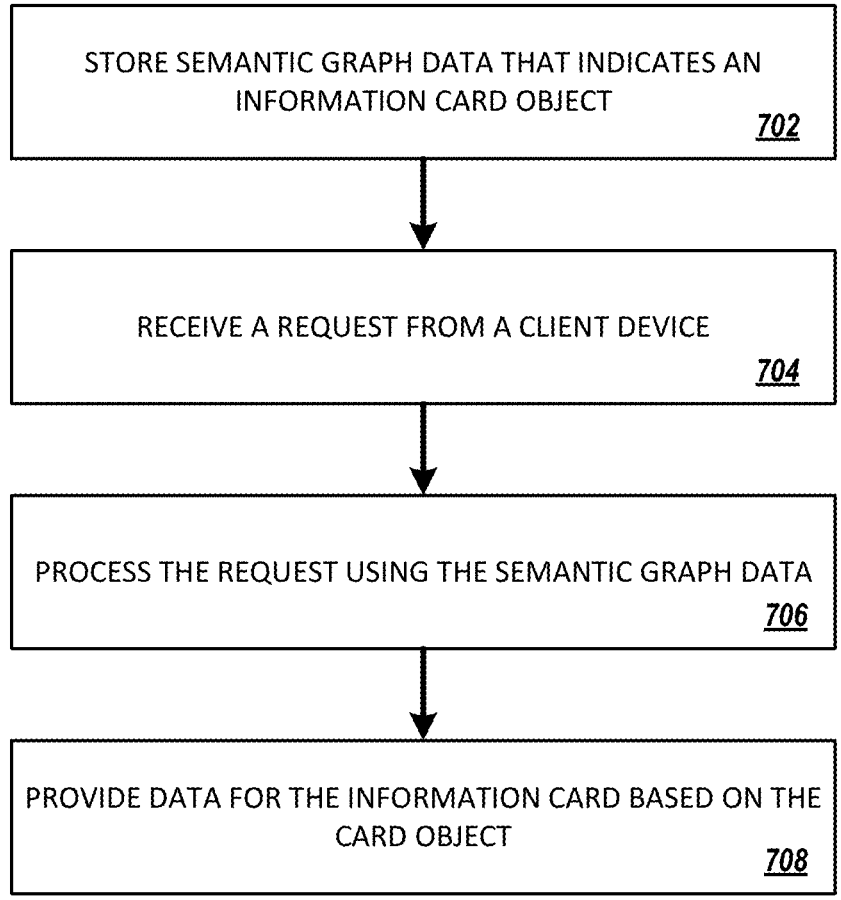
FIG. 7 is a flow diagram showing a process for providing information cards using semantic graph data.

FIG. 6 is a diagram illustrating examples of objects and connections of a semantic graph 600. In this example, a card object 605 represents a card for a specific entity, e.g., the information card of a specific company, rather than a category or group of entities of a same type. Here, the card object 605 represents characteristics of an information card for company C. The card object 605 can be directly connected with the relevant attributes, metrics, and other data objects in the semantic graph that are used to generate the information card for company C. This approach provides greater customization, as the card for each individual entity may be customized and adjusted by changing the content of the card object and its connections in the semantic graph. However, it may not provide consistency across all entities of the same type, and may require additional work to create or customize individualized cards.

In the example, the card object 605 has certain connections that specify that the associated object represents content to be included in the information card that the card object 605 represents. Examples include the connections of the card object 605 to the location object 613 and the phone number object 611. These objects 613, 611 are also separately connected to the company C object 610 as attributes of company C. The semantic graph 600 also shows presentation trigger connections for the objects 613 and 610, indicating that the card for card object 605 is triggered as relevant when a data context involves the objects 613 or 610, or other keywords or values associated with the objects 613 or 610.

In some implementations, both the approaches of FIGS. 5 and 6 can be used together, with some entities having their own customized or individualized card objects, but with more general or default card objects representing the template for information cards for entities that do not have specific cards defined.

Semantic graph data for a semantic graph is stored (702). The semantic graph data indicates objects and relationships among the objects. The objects include a card object that represents characteristics of an information card. The card object may represent a template for providing information cards for entities in a category of entities. For example, the card object can be connected, in the semantic graph, to each of multiple objects representing different entities in the category such that the card object can be used to provide an information card for each of the different entities. In some cases, the card object represents an information card for a specific entity.

The semantic graph data includes data indicating one or more triggers or conditions for presenting the information card. For example, the one or more triggers or conditions are represented as characteristics of the card object. As another example, the one or more triggers or conditions are represented as one or more connections of the card object with one or more other objects.

A request from a client device is received (704). As a few examples, the request may be a query, a request for a document, a request for an application or user interface, a request for a recommendation, a request to access a resource, or a request to retrieve data from a data repository. In some implementations, the request indicates one or more terms associated with a context of the client device.

The request from the client device is processed using the semantic graph data (706). In some implementations, the request is a query. In evaluating the query, a computer system can identify one or more entities that are (i) referenced in the query, (ii) used in generating results to the query, or (iii) referred to in the results generated for the query. The computer system can then identify one or more objects in the semantic graph that correspond to the one or more entities. The computer system can then provide data for an information card for one of the identified one or more entities, for example, using the objects in the semantic graph that correspond to the one or more entities.

Data for the information card represented by the card object is presented to the client device based on the card object indicated by the semantic graph data (708). A computer system can select, from among a plurality of indicators associated with an entity, a proper subset of the indicators based on semantic graph data for the card object. Then, the proper subset of indicators identified using the card object is provided as the data for the information card.

In some implementations, a computer system uses context information to determine which data should be provided and when. For example, when context data is received with a request, a computer system can determine, based on the semantic graph data, that the one or more terms correspond to the information card represented by the card object. The computer system can provide the data for the information card to the client device is based on determining that the one or more terms correspond to the information card.

In some implementations, the method includes: identifying, from among the objects indicated by the semantic graph data, one or more objects referenced in content provided to a client device; and providing information card data for information cards based on card objects connected to the identified one or more objects in the semantic graph.

In some implementations, the card object is connected to synonym object in the semantic graph, and one or more computers are configured to provide the data for the information card based on an occurrence of a synonym for an entity name indicated by the synonym object.

To enable quick retrieval of information card data, a computer system can retrieve a portion of a data set used to calculate a metric for an entity from a data repository or an in-memory data store. For example, the data can be data used to perform a calculation for which the result is used in an information card. The metric can be calculated based on the retrieved portion of the data set, and the metric and/or the retrieved portion of the data set can be stored in a cache, e.g., a server-side cache.

As another way to facilitate fast presentation of information cards, a computer system can provide data to a client device so it is ready when it is time for the client device to generate and present an information card. For example, one or more computers can generate and provide, to one or more client devices, cache data for one or more information cards in order to populate a cache of the one or more client devices. The cache data can include layout or formatting information for the one or more information cards, content to be presented on the one or more information cards, or a presentation trigger or condition for the one or more information cards.

In some implementations, a computer system analyzes access data indicating access to content by a user. The computer system selects, based on the analysis of the access data, a set of objects referenced in the content accessed by the user. The computer system then provides, to a device associated with the user, data for information cards corresponding to the objects in the set. This use of user history may be used to recommend cards and associated information in response to or as part of processing a user's request. Alternatively, this use of user history may occur separate from and in addition to the processing of a current request and the current context of a user's device. For example, even without a request from a client device, a computer system can periodically recommend information cards based on user history or detected indications of a context of a user device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
    storing, by the one or more computers, semantic graph data for a semantic graph, wherein the semantic graph data indicates objects and relationships among the objects, wherein the objects include a card object that represents characteristics of an information card, wherein the card object specifies multiple types of data to include in a presentation of the information card;
    receiving, by the one or more computers, a request from a client device;
    in response to receiving the request:
        identifying, by the one or more computers, an entity related to the request and an object represented in the semantic graph that corresponds to the entity;
        using, by the one or more computers, the card object represented in the semantic graph to determine a set of attributes and/or metrics to include in presentation of the information card for the entity; and
        retrieving, by the one or more computers, data for the information card, including values for the set of attributes and/or metrics for the entity; and
    providing, by the one or more computers, the retrieved data for the information card to the client device based on the card object indicated by the semantic graph data.

2. The method of claim 1, wherein the semantic graph data includes data indicating one or more triggers or conditions for presenting the information card.

3. The method of claim 2, wherein the one or more triggers or conditions are represented as characteristics of the card object, including one or more keywords that, when present a user interface or are interacted with by a user, trigger display of the information card defined by the card object.

4. The method of claim 2, wherein the one or more triggers or conditions are represented as one or more connections of the card object with one or more other objects.

5. The method of claim 1, wherein the card object represents a template for providing information cards for entities in a category of entities.

6. The method of claim 5, wherein the card object is connected, in the semantic graph, to each of multiple objects representing different entities in the category such that the connections designate the card object to be used to provide information cards for each of the different entities.

7. The method of claim 1, wherein the card object is connected to synonym object in the semantic graph; and wherein the one or more computers are configured to provide the data for the information card based on an occurrence of a synonym for an entity name indicated by the synonym object.

8. The method of claim 1, comprising:
retrieving, from a data repository or an in-memory data store, a portion of a data set used to calculate a metric for an entity;
calculating the metric based on the retrieved portion of the data set; and
storing the metric and/or the retrieved portion of the data set in a cache.

9. The method of claim 1, comprising providing, by the one or more computers to one or more client devices, cache data for one or more information cards to populate a cache of the one or more client devices, the one or more information cards having content defined by one or more corresponding card objects represented in the semantic graph, wherein the cache data provided for each of the one or more information cards includes (i) content to be presented in the information card, and (ii) a presentation trigger or condition specifying when the information card should be presented.

10. The method of claim 1, wherein the request indicates one or more terms associated with a context of the client device;
wherein the method includes determining, based on the semantic graph data, that the one or more terms correspond to the information card represented by the card object; and
wherein providing the data for the information card to the client device is based on determining that the one or more terms correspond to the information card.

11. The method of claim 1, comprising:
identifying, from among the objects indicated by the semantic graph data, one or more objects referenced in content provided to a client device; and
providing information card data for information cards based on card objects connected to the identified one or more objects in the semantic graph.

12. The method of claim 1, comprising selecting, from among a plurality of indicators associated with the entity, a proper subset of the indicators based on semantic graph data for the card object;
wherein providing the data for the information card comprises providing the proper subset of indicators associated with the entity.

13. The method of claim 1, comprising:
analyzing access data indicating access to content by a user;
selecting, based on the analysis of the access data, a set of objects referenced in the content accessed by the user; and
providing, to a device associated with the user, data for information cards corresponding to the objects in the set of objects referenced in the content accessed by the user.

14. The method of claim 1, wherein the card object represents an information card for the entity.

15. A system comprising:
one or more computers; and
one or more non-transitory computer-readable media storing instructions that, when executed by the one or more computers, cause the one or more computers to perform operations comprising:
storing, by the one or more computers, semantic graph data for a semantic graph, wherein the semantic graph data indicates objects and relationships among the objects,
wherein the objects include a card object that represents characteristics of an information card, wherein the card object specifies multiple types of data to include in a presentation of the information card;
receiving, by the one or more computers, a request from a client device;
in response to receiving the request:
identifying, by the one or more computers, an entity related to the request and an object represented in the semantic graph that corresponds to the entity;
using, by the one or more computers, the card object represented in the semantic graph to determine a set of attributes and/or metrics to include in presentation of the information card for the entity; and
retrieving, by the one or more computers, data for the information card, including values for the set of attributes and/or metrics for the entity; and
providing, by the one or more computers, the retrieved data for the information card to the client device based on the card object indicated by the semantic graph data.

16. One or more non-transitory computer-readable media storing instructions that, when executed by one or more computers, cause the one or more computers to perform operations comprising:
storing, by the one or more computers, semantic graph data for a semantic graph, wherein the semantic graph data indicates objects and relationships among the objects, wherein the objects include a card object that represents characteristics of an information card, wherein the card object specifies multiple types of data to include in a presentation of the information card;
receiving, by the one or more computers, a request from a client device;
in response to receiving the request:
determining, by the one or more computers, an entity related to the request and an object represented in the semantic graph that corresponds to the entity;
using, by the one or more computers, the card object represented in the semantic graph to determine a set of attributes and/or metrics to include in presentation of the information card for the entity; and
retrieving, by the one or more computers, data for the information card, including values for the set of attributes and/or metrics for the entity; and
providing, by the one or more computers, the retrieved data for the information card to the client device based on the card object indicated by the semantic graph data.

17. The method of claim 1, wherein multiple card objects are represented in the semantic graph, each of the card objects corresponding to a different entity type; and
wherein the method comprises, in response to receiving the request, selecting the card object to set content for the information card, wherein the card object is selected from among the multiple card objects based on the semantic graph data.

18. The method of claim 17, wherein the card object is selected from among the multiple card objects based on a connection in the semantic graph between an object representing the entity and the card object.

19. The method of claim 1, wherein the semantic graph data specifies a plurality of attributes and/or metrics that are available for the entity;

wherein the card object specifies the set of attributes and/or metrics to include in presentation of the information card for the entity, wherein the set of attributes and/or metrics is a subset that includes fewer than all of the attributes and/or metrics that are available for the entity; and wherein retrieving the data for the information card comprises retrieving values for the subset that includes fewer than all of the attributes and/or metrics that are available for the entity.

20. The method of claim 1, wherein the card object corresponds to a particular entity type; and wherein the method further comprises using the card object to define content to include in information cards for each multiple different entities of the particular entity type.

* * * * *